(12) United States Patent
Kashihara et al.

(10) Patent No.: US 12,036,857 B2
(45) Date of Patent: Jul. 16, 2024

(54) LOWER STRUCTURE OF AN ELECTRIC VEHICLE WITH COLLISION PROTECTION FOR ELECTRONIC COMPONENTS

(71) Applicant: Mazda Motor Corporation, Hiroshima (JP)

(72) Inventors: Hiroaki Kashihara, Hiroshima (JP); Yoshinori Ikeda, Hiroshima (JP); Daisuke Tsuji, Hiroshima (JP); Kohichi Tanimoto, Hiroshima (JP); Toshihiko Kawamura, Hiroshima (JP); Noriharu Yamasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 340 days.

(21) Appl. No.: 17/666,541

(22) Filed: Feb. 7, 2022

(65) Prior Publication Data
US 2022/0305896 A1    Sep. 29, 2022

(30) Foreign Application Priority Data

Mar. 26, 2021    (JP) .................................. 2021-053435

(51) Int. Cl.
*B60K 1/04*    (2019.01)
*B60L 50/60*    (2019.01)
*B60R 16/08*    (2006.01)
*B62D 25/20*    (2006.01)

(52) U.S. Cl.
CPC ............... *B60K 1/04* (2013.01); *B60L 50/66* (2019.02); *B60R 16/08* (2013.01); *B62D 25/20* (2013.01); *B60K 2001/0438* (2013.01); *B60Y 2200/91* (2013.01)

(58) Field of Classification Search
CPC ... B60K 1/04; B60K 2001/0438; B60L 50/66; B60L 58/26; B62D 25/20
See application file for complete search history.

(56) References Cited

U.S. PATENT DOCUMENTS

| 7,896,115 | B2 * | 3/2011 | Ono ....................... | B62D 25/20 180/68.3 |
| 7,896,117 | B2 * | 3/2011 | Jung ....................... | B60K 1/04 180/68.5 |
| 8,517,127 | B2 * | 8/2013 | Kanno ..................... | B60L 58/26 180/65.8 |
| 8,770,326 | B2 * | 7/2014 | Matano .................... | B60K 1/00 180/65.1 |
| 9,446,657 | B2 * | 9/2016 | Takahashi ................ | B60K 6/36 |

(Continued)

FOREIGN PATENT DOCUMENTS

JP    2020-172879 A    10/2020

*Primary Examiner* — Jason D Shanske
*Assistant Examiner* — James J Triggs
(74) *Attorney, Agent, or Firm* — XSENSUS LLP

(57) ABSTRACT

The lower structure of an electric vehicle includes: an automatic transmission provided below a floor panel and in an intermediate portion in a right-left direction thereof; an inverter arranged between the automatic transmission and a floor side frame; and an attachment bracket for attaching the inverter to the floor panel. The attachment bracket has an outer shell structure including: an inner wall portion dividing the inverter and the automatic transmission; an outer wall portion dividing the inverter and the floor side frame; an upper wall portion; and a lower wall portion.

20 Claims, 11 Drawing Sheets

(56) References Cited

U.S. PATENT DOCUMENTS

| | | | |
|---|---|---|---|
| 9,764,644 B2* | 9/2017 | Nishida | B60L 3/00 |
| 9,919,747 B2* | 3/2018 | Ishizaki | B62D 25/2036 |
| 10,730,379 B2* | 8/2020 | Tambo | B60L 50/71 |
| 2011/0168468 A1* | 7/2011 | Taguchi | B60L 15/20 |
| | | | 180/65.245 |
| 2017/0225715 A1* | 8/2017 | Kobayashi | B60L 50/64 |
| 2020/0062097 A1* | 2/2020 | Hara | B62D 47/02 |

* cited by examiner

LOWER STRUCTURE OF AN ELECTRIC VEHICLE WITH COLLISION PROTECTION FOR ELECTRONIC COMPONENTS

CROSS-REFERENCE TO RELATED APPLICATION

The present application claims priority to Japanese application number 2021-053435 filed in the Japanese Patent Office on Mar. 26, 2021, the entire contents of which is incorporated herein by reference.

TECHNICAL FIELD

A disclosed technique relates to a lower structure of an electric vehicle, such as a hybrid vehicle or an electric car, capable of traveling by using electric power.

BACKGROUND

In the hybrid vehicle in Patent document 1, an inverter, a converter, a battery, and the like as high-voltage driving components are arranged under a floor panel. More specifically, a 48-V battery is arranged inside a tunnel section. In an area on a left side of the tunnel section, the inverter and the converter are aligned in series in a front-rear direction.

In the area on the left side of the tunnel section, a floor side frame and a tunnel side frame, each of which extends in the front-rear direction, are provided at a spaced interval. A panel-shaped bracket is hung between these floor side frame and tunnel side frame by being bolted thereto. The inverter is fixed onto this bracket.
[Patent document 1] JP-A-2020-172879

SUMMARY

In a typical case where another vehicle collides with a side of a hybrid vehicle (e.g., hybrid vehicle in Patent document 1) (a so-called lateral collision), the floor panel is possibly deformed, and the bolt that attaches the bracket is possibly sheared. Accordingly, during the lateral collision, it is concerned that the inverter is held, falls, or is fractured between the floor side frame and the tunnel side frame.

The present disclosure solves at least this problem by arranging the high-voltage components in the electric vehicle in the area on the lateral side of the tunnel section in the floor panel so that even in the case where the electric vehicle receives a significant impact from the lateral side, the high-voltage components can effectively be protected.

A disclosed technique relates to a lower structure of an electric vehicle on which a high-voltage driving battery is mounted and which can travel by using electric power thereof.

A lower structure of the electric vehicle includes: a floor panel that expands in a lower portion of a cabin; a specified vehicle structure that is provided below the floor panel and in an intermediate portion in a right-left direction thereof; a pair of floor side frames that extends in a front-rear direction along right and left portions of the lower surface of the floor panel; a specified high-voltage component that is connected to the high-voltage battery and is arranged between the vehicle structure and one of the floor side frames; and an attachment bracket that attaches the high-voltage component to the floor panel.

The attachment bracket has an outer shell structure including: an inner wall portion that at least partially divides the high-voltage component and the vehicle structure; an outer wall portion that at least partially divides the high-voltage component and the floor side frame; an upper wall portion that is hung between an upper edge of the inner wall portion and an upper edge of the outer wall portion; and a lower wall portion that is hung between a lower edge of the inner wall portion and a lower edge of the outer wall portion.

That is, the electric vehicle is provided with the specified vehicle structure (for example, a vehicle component or a structure such as a frame) below the floor panel, which extends below the cabin, and in the intermediate portion in the right-left direction thereof. The pair of floor side frames extends in the front-rear direction along the right and left portions of the lower surface of the floor panel.

In addition, the high-voltage driving battery is mounted on this electric vehicle. A voltage of the high-voltage driving battery is higher than that of a battery (usually, a lead-acid battery with a voltage of 12 V) used as a power supply for an air conditioner or the like. The electric vehicle can travel by using electric power thereof. Examples of the electric vehicle are a hybrid vehicle and an electric car.

The electric vehicle includes the high-voltage components, such as a motor, an inverter, and a converter, that are connected to the high-voltage battery. Each of such specified high-voltage components is arranged between the above-described vehicle structure and one of the floor side frames, and is attached to the floor panel by the attachment bracket.

The attachment bracket has the outer shell structure including: the inner wall portion that at least partially divides the high-voltage component and the vehicle structure; the outer wall portion that at least partially divides the high-voltage component and the floor side frame; the upper wall portion; and the lower wall portion.

That is, according to this lower structure of the electric vehicle, first, the high-voltage component is surrounded by the attachment bracket. Thus, the high-voltage component can be protected against a bouncing stone and the like during the travel. In addition, since the vehicle structure and the floor side frame are provided on both sides of the high-voltage component, the high-voltage component can be protected further effectively. Although a space below a vehicle body is small and limited in an up-down direction, the space can effectively be used by such arrangement.

Secondly, since the outer shell structure is constructed of the attachment bracket, the high-voltage component can effectively be protected even during a collision.

That is, there is a case where the vehicle body of the electric vehicle is deformed or damaged by the collision against the electric vehicle from a lateral side (a so-called lateral collision). In such a case, there is a risk that the high-voltage component falls or that the deformed floor side frame hits the high-voltage component.

In particular, in the case where the high-voltage component is arranged between the vehicle structure and the floor side frame as in this electric vehicle, the high-voltage component is possibly crushed by being held therebetween. To handle such a problem, in this electric vehicle, the high-voltage component is surrounded by the outer shell structure constructed of the attachment bracket.

Thus, when the floor side frame is deformed and moves inward and the attachment bracket is pressed inward, the attachment bracket contacts the vehicle structure and is pressed from both of the right and left sides. At this time, since the outer shell structure is constructed of the attachment bracket, the attachment bracket can be stretched against these pressing forces. Thus, the attachment bracket can be prevented from being crushed. An external force does not act on the high-voltage component that is stored in the attachment bracket. Thus, even when the lateral collision occurs, the high-voltage component can be protected.

It is possible to prevent the attachment bracket including the high-voltage component from falling since the attachment bracket is held between the vehicle structure and the floor side frame by a large force. Furthermore, due to stretching action of the attachment bracket, a clearance between attachment portions of the attachment bracket, that is, fastened portions with attachment bolts is not significantly changed. Thus, a shearing force that acts on each of the attachment bolts is also suppressed. Shearing of each of the attachment bolts can also be prevented.

The lower structure of the electric vehicle further includes: a tunnel section that is provided to extend in the front-rear direction by recessing the intermediate portion in the right-left direction of the floor panel upward; and a tunnel side frame that extends along a lower edge of the tunnel section. The vehicle structure may be a transmission that is arranged in the tunnel section, the outer wall portion may oppose a lateral surface of the floor side frame, and the inner wall portion may oppose a lateral surface of the transmission when the attachment bracket is attached to the tunnel side frame.

That is, according to this lower structure of the electric vehicle, the above-described vehicle structure is the transmission that is arranged in the tunnel section. In addition, the outer wall portion opposes the lateral surface of the floor side frame, and the inner wall portion opposes the lateral surface of the transmission when the attachment bracket is attached to the tunnel side frame.

Accordingly, during the lateral collision, the attachment bracket is held between the floor side frame and the transmission. Then, the attachment bracket exerts the stretching action when being pressed against these. Since the attachment bracket is attached to the tunnel side frame, a lateral surface of the transmission, which is arranged in the tunnel section, can be used. Since there is no need to hold the attachment bracket between the floor side frame and the tunnel side frame, it is possible to avoid enlargement of a cross section of the tunnel side frame. Since the attachment bracket can be enlarged on the side of the transmission, a lateral width of the high-voltage component can be increased.

The lower structure of the electric vehicle further includes a second high-voltage component that is connected to the high-voltage battery and is arranged between the vehicle structure and the floor side frame. The second high-voltage component may be arranged below the lower wall portion so as to overlap the high-voltage component.

In this way, the attachment bracket can also be used as a bracket for attaching the second high-voltage component to the floor panel. Thus, the number of components can be reduced. As a result, cost of members can be reduced. In addition, even when the lateral collision occurs, due to the stretching state of the attachment bracket, there is no possibility that the second high-voltage component is crushed. Since the attachment bracket does not fall, the second high-voltage component does not fall, either. Thus, the second high-voltage component can also be protected even when the lateral collision occurs.

The lower structure of the electric vehicle further includes: a front subframe that is arranged in front of the floor panel and one of right and left rear end portions of which is located in front of the high-voltage component; and a guide bracket that is arranged between the front subframe and the high-voltage component. The guide bracket may have: a guide surface section that is inclined upward to the front; and a pair of flange sections that is provided on both sides of the guide surface section. One of the flange sections may be attached to the floor side frame, another of the flange sections may be attached to the tunnel side frame, and the guide surface section may guide the front subframe to a position below the second high-voltage component when the front subframe moves rearward.

That is, according to this lower structure of the electric vehicle, the front subframe is arranged in front of the floor panel, and one of the right and left rear end portions thereof is located in front of the high-voltage component. Then, the guide bracket is arranged between the front subframe and the high-voltage component.

The guide bracket is attached on both sides to the floor side frame and the tunnel side frame, and has the guide surface section that is inclined upward to the front. The guide surface section guides the front subframe to the position below the second high-voltage component when the front subframe moves rearward.

Accordingly, although there is a case where the front subframe moves rearward during a frontal collision or an oblique collision of the electric vehicle, even in such a case, the guide surface section can protect the high-voltage component and the second high-voltage component. Furthermore, the guide surface section is attached to both of the tunnel side frame and the floor side frame. Accordingly, during the lateral collision, the guide surface section cooperates with the attachment bracket, and can thereby suppress the floor panel from being crushed in the right-left direction. Thus, it is possible to further protect the high-voltage component and the second high-voltage component during the lateral collision.

In the lower structure of the electric vehicle, the guide bracket may have a vertical wall portion that opposes the vehicle structure in the right-left direction.

In this way, the vertical wall portion of the guide bracket also abuts the vehicle structure during the lateral collision. Similar to the attachment bracket, the guide bracket is also brought into a stretched state in the right-left direction. Since the guide bracket is also firmly supported, the guide bracket can be prevented from falling.

The lower structure of the electric vehicle further includes at least one pipe that extends in the front-rear direction along the floor panel to cause a fluid to flow therethrough. The pipe may be routed above the upper wall portion.

In this way, the pipe can also be protected against the lateral collision by the stretching action of the attachment bracket.

In particular, in the case where a plurality of the pipes are provided, the plural pipes are preferably routed in a state of being concentrated in a central portion in the right-left direction of the upper wall portion.

In this way, these pipes are located away from both of right and left sides of the attachment bracket. Thus, even when the plural pipes are provided, the plural pipes can effectively be protected against the lateral collision due to the stretching action of the attachment bracket.

The electric vehicle to which the disclosed technique is applied can effectively protect the high-voltage component even when receiving a significant impact from a lateral side.

DETAILED DESCRIPTION

A description will hereinafter be made on an embodiment to which the disclosed technique is applied. Each of front-rear, right-left, and up-down directions in the description will be set with a vehicle being a reference. In each of the drawings, these directions are indicated by arrows. The right-left direction corresponds to a vehicle width direction.

<Lower Structure of Electric Vehicle>

Figure 1:
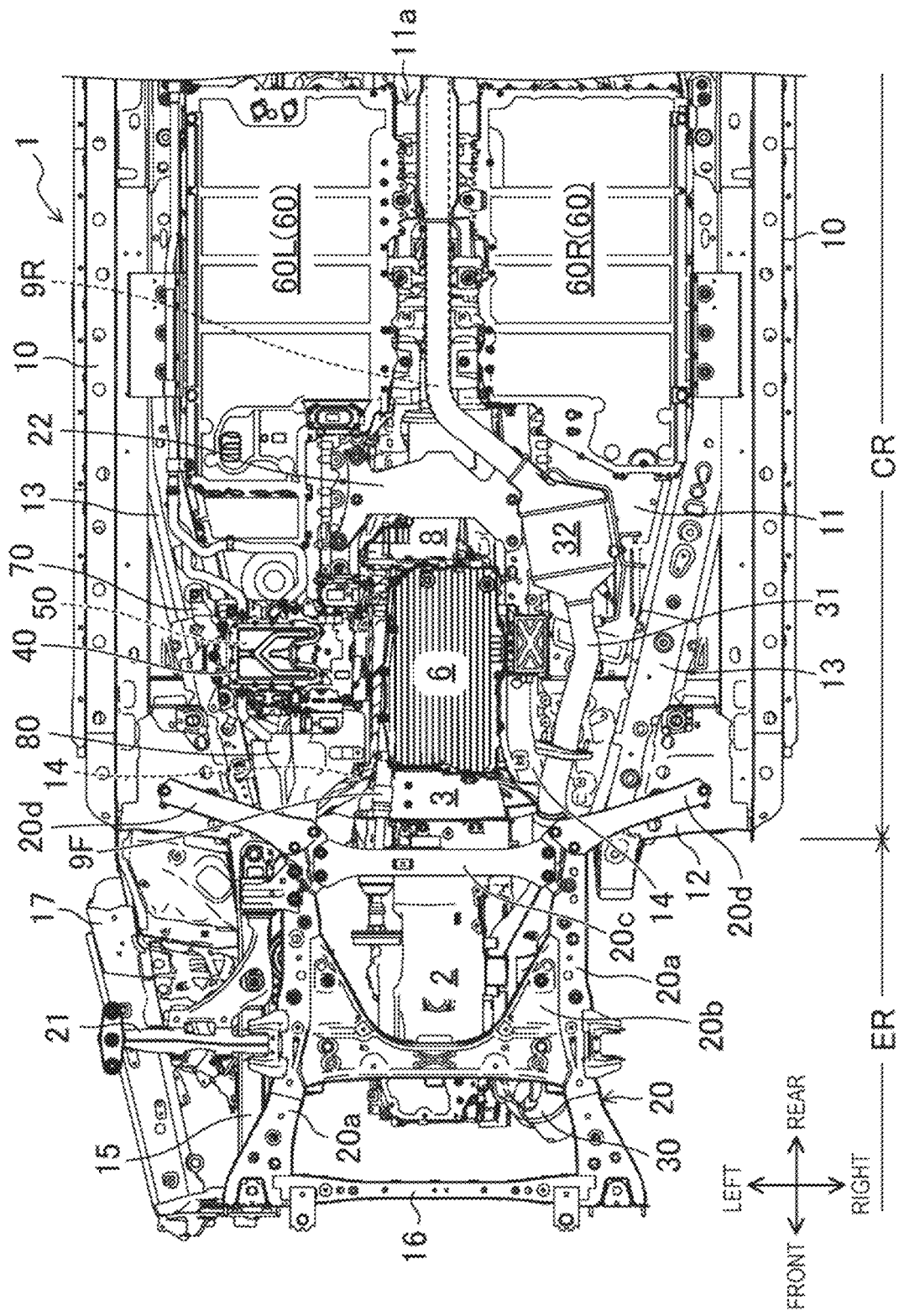
FIG. 1 is a schematic view in which a lower structure of a front portion of an electric vehicle is seen from below.

FIG. 1 illustrates a lower structure of an electric vehicle 1 in the embodiment. FIG. 1 is a schematic view in which a lower structure of a front portion of the electric vehicle 1 is seen from below. Compared to a left portion of the electric vehicle 1, a part of a right portion thereof is not illustrated in FIG. 1 for convenience. In the other drawings, some portions are also omitted appropriately.

Figure 2:
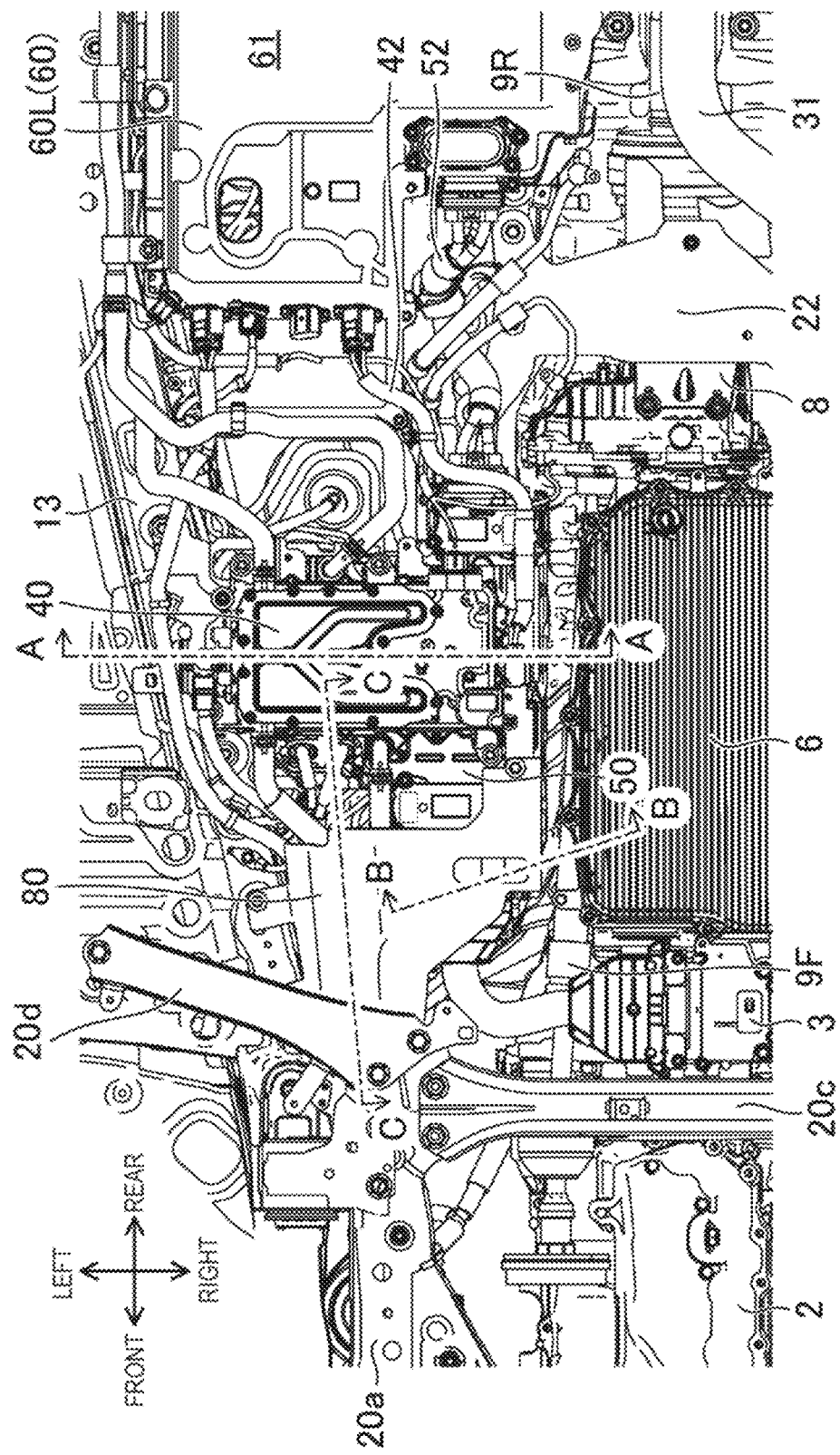
FIG. 2 is an enlarged view of a main section in FIG. 1.
Figure 3:
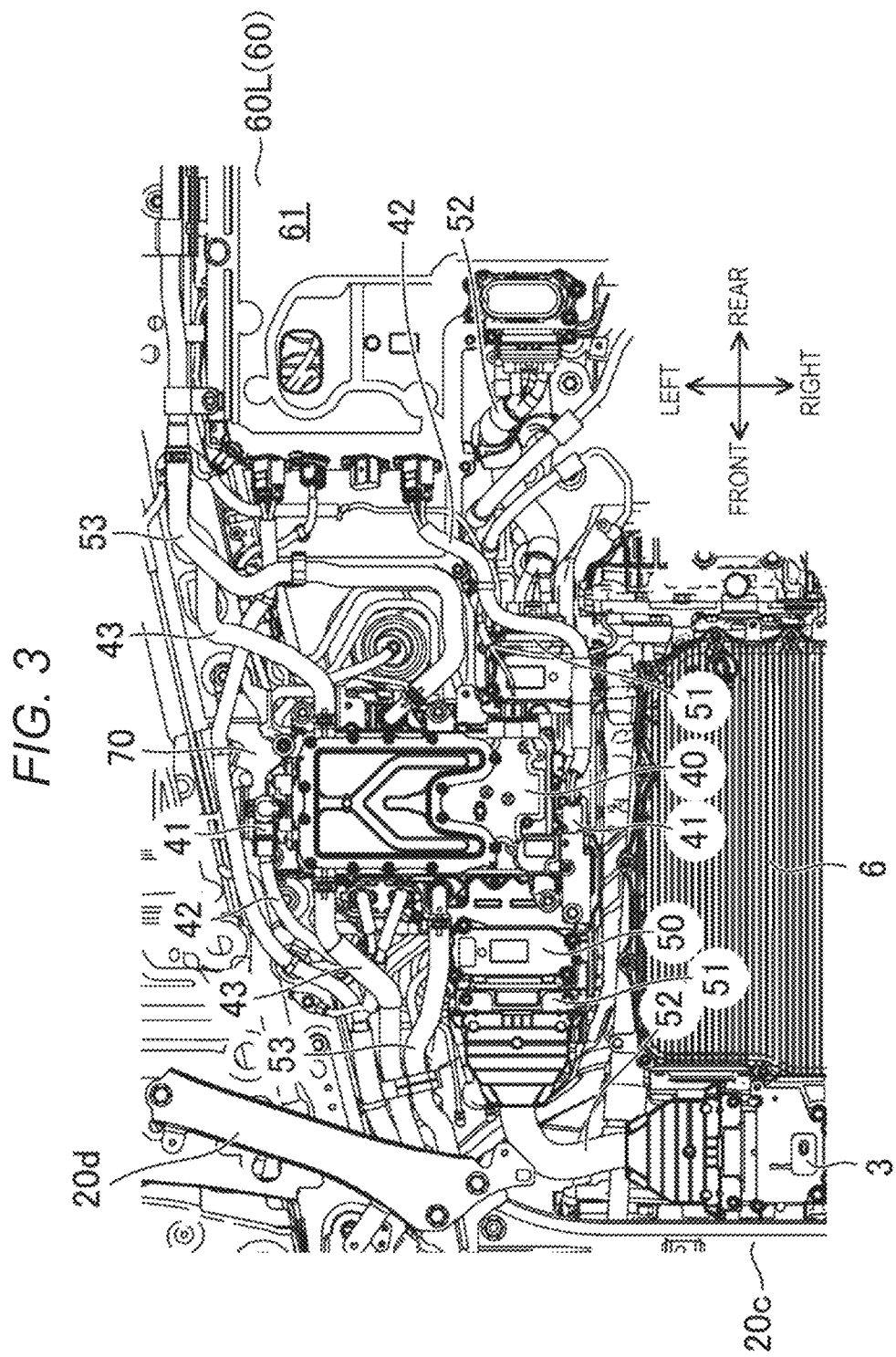
FIG. 3 is a view which corresponds to FIG. 2 and in which a guide bracket is not illustrated.
Figure 4:
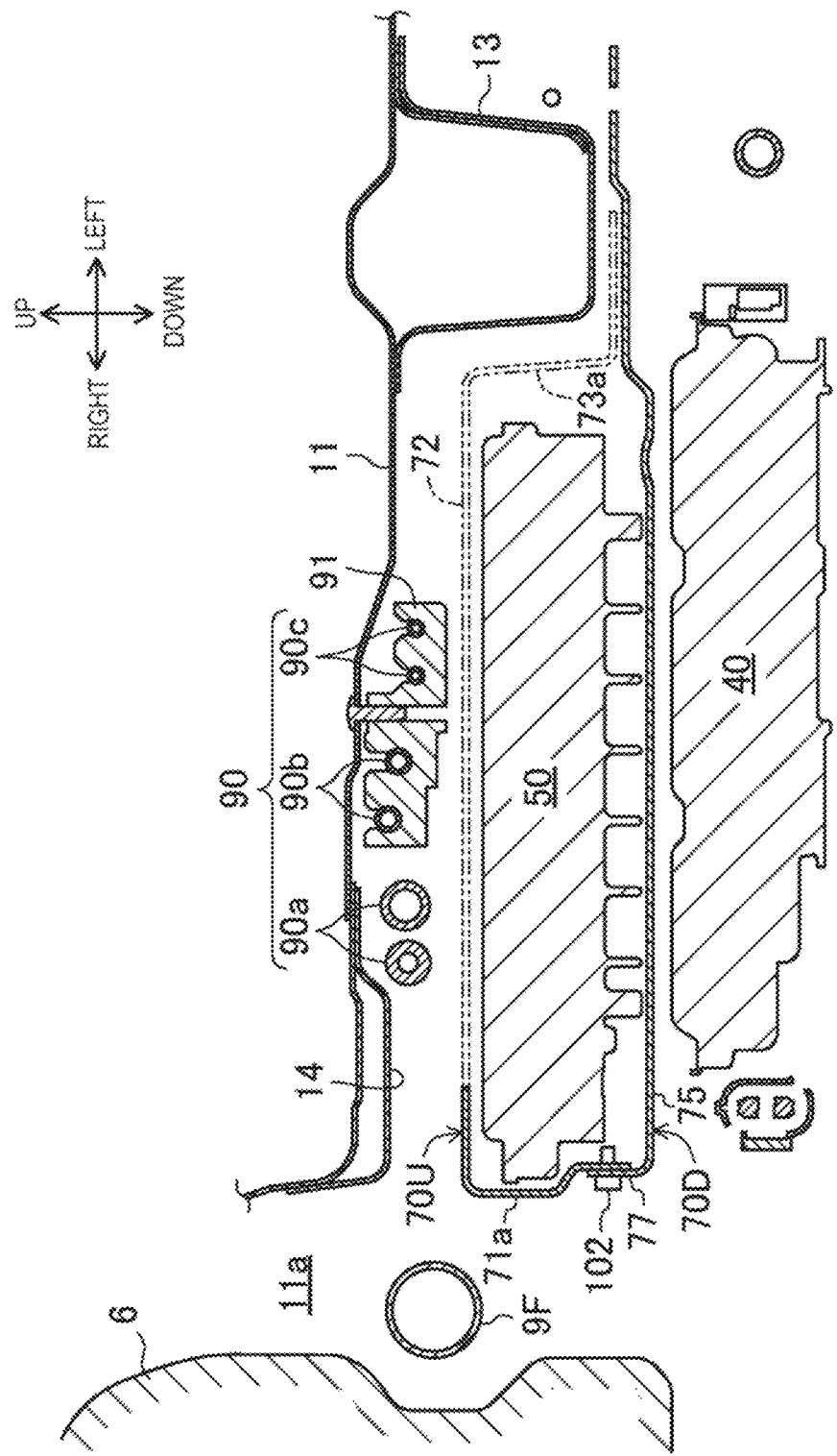
FIG. 4 is a schematic cross-sectional view of a portion indicated by arrow A-A in FIG. 2.
Figure 5:
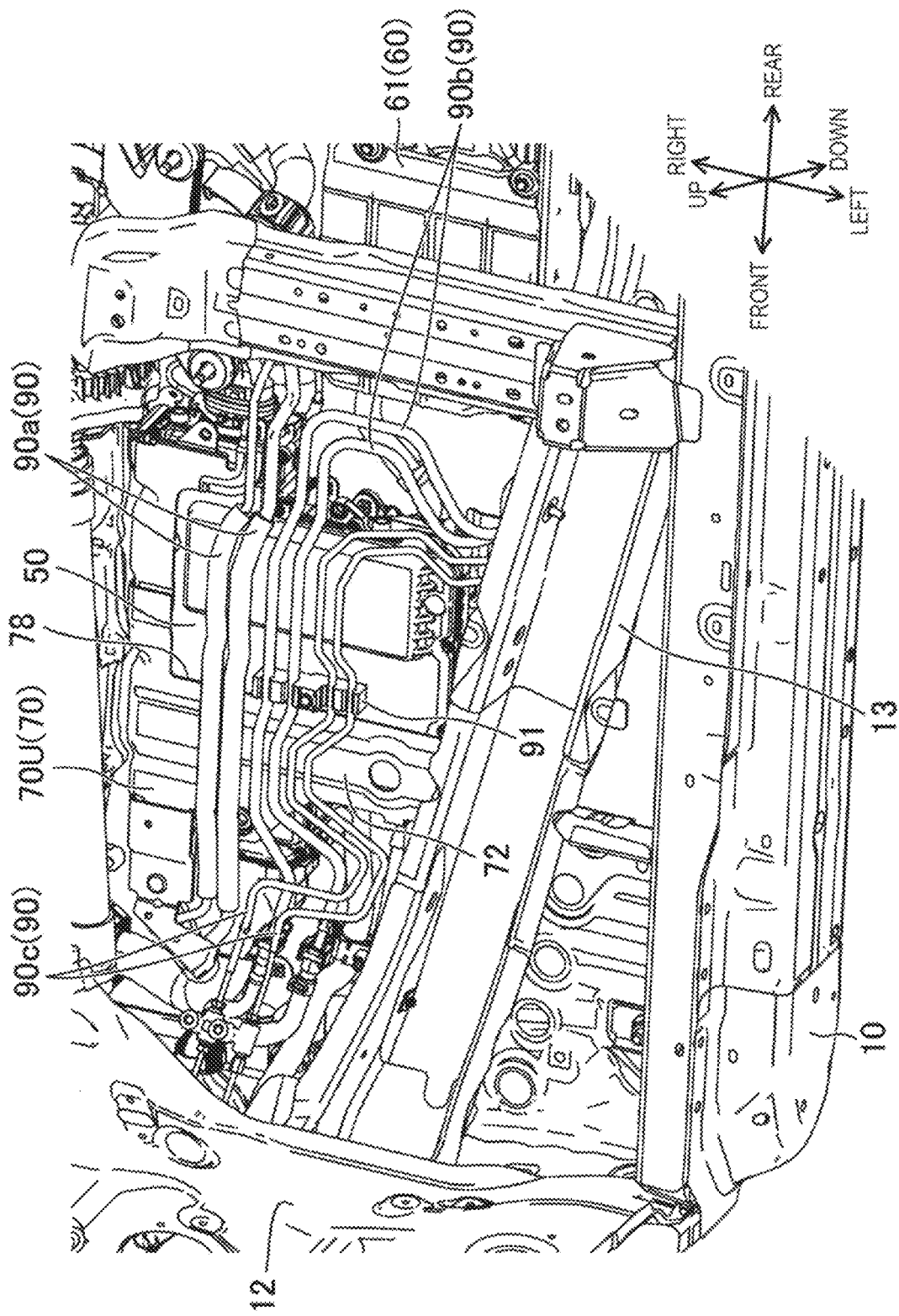
FIG. 5 is a schematic perspective view of a main section of the electric vehicle that is seen obliquely downward from rear and left.

FIG. 2 is an enlarged view of a main section in FIG. 1. FIG. 3 is a view which corresponds to FIG. 2 and in which a guide bracket is not illustrated. FIG. 4 is a schematic cross-sectional view of a portion that is taken along arrow A-A in FIG. 2. FIG. 5 is a schematic perspective view of a main section of the electric vehicle 1 that is seen from above and rear.

The electric vehicle 1 is a hybrid vehicle. That is, an engine 2 and a motor 3 are mounted as drive sources. As a result, the electric vehicle 1 travels by driving the engine 2 only, by driving the motor 3 only, or by driving both of the engine 2 and the motor 3. The disclosed technique is not limited to the hybrid vehicle, but can also be applied to an electric car on which only a motor is mounted.

In addition, the electric vehicle 1 is a so-called FR vehicle. The electric vehicle 1 includes an engine compartment in front of a cabin and travels by driving rear wheels. The electric vehicle 1 also drives front wheels with the rear wheels when necessary (four-wheel-drive). In FIG. 1, the cabin is provided in a range indicated by CR, and the engine compartment is provided in a range indicated by ER.

As illustrated in FIG. 1, a pair of side sills 10, 10 extending in parallel in the front-rear direction is arranged on both of right and left sides of a lower portion of the cabin. A substantially horizontal floor panel 11 that expands in the lower portion of the cabin is arranged between these side sills 10, 10. In an intermediate portion in the right-left direction of the floor panel 11, a tunnel section 11a that is recessed upward (to the cabin side) is provided in a manner to extend in the front-rear direction.

A front edge portion of the floor panel 11 is coupled to a lower edge portion of a dashboard 12 that extends in the right-left direction in a state of facing the front-rear direction. A boundary portion between the floor panel 11 and the dashboard 12 is curved upward to the front. The dashboard 12 divides a front portion of the cabin from the engine compartment. The tunnel section 11a extends beyond the dashboard 12 to the engine compartment.

In a portion between each of the side sills 10 and the tunnel section 11a in the floor panel 11, a floor side frame 13 and a tunnel side frame 14 are provided in a manner to extend in the front-rear direction. Each of these floor side frame 13 and tunnel side frame 14 constitutes a closed cross-sectional structure by joining a gutter-shaped member to a lower surface of the floor panel 11. Compared to the tunnel side frame 14, the floor side frame 13 is projected significantly downward from the floor panel 11 (see FIG. 4).

Each of the tunnel side frames 14 is arranged to extend along a lower edge of the tunnel section 11a. Each of the floor side frames 13 is arranged along a lateral portion of the lower surface of the floor panel 11, in detail, between respective one of the tunnel side frames 14 and the side sill 10 in the floor panel 11. A front end portion of each of the tunnel side frames 14 is connected to the adjacent floor side frame 13.

The engine 2 is vertically arranged substantially at a center in the vehicle width direction of the engine compartment. That is, the engine 2 is arranged such that a rotation axis thereof extends in the front-rear direction.

On both of right and left sides of the engine compartment, a pair of front side frames 15, 15 extends in the front-rear direction (the right front side frame 15 is not illustrated). In a state of being curved downward, a rear end portion of each of the front side frames 15 is coupled to a front end portion of respective one of the floor side frames 13. A crossmember 16 is hung (installed in a hung state) between front end portions of the front side frames 15.

An apron member 17 is arranged above and on an outer side in the vehicle width direction of each of the front side frames 15. Meanwhile, a front subframe 20 is arranged below and on an inner side in the vehicle width direction of both of the front side frames 15. The front subframe 20 is arranged in a lower portion of the engine compartment, and the engine 2, a front suspension 21, and the like are supported by the front subframe 20.

The front subframe 20 is constructed of a right and left pair of side frame sections 20a, 20a, a front suspension member section 20b, a rear suspension member section 20c, a right and left pair of brace sections 20d, 20d, and the like. The front subframe 20 is configured to be bilaterally-symmetrical.

Each of the side frame sections 20a extends in the front-rear direction along a lower side of respective one of the front side frames 15. In detail, each of the side frame sections 20a is located in the lower portion of the engine compartment in front of the dashboard 12, and is arranged at a lower position than the dashboard 12 and the floor panel 11 (see FIG. 10).

A front end portion of each of the side frame sections 20a is curved upward and is coupled to the front end portion of respective one of the front side frames 15. A rear end portion of each of the side frame sections 20a is located immediately in front of and below the dashboard 12, and is coupled to the rear end portion of respective one of the front side frames 15. The rear suspension member section 20c, which extends in the right-left direction, is hung between the rear end portions of the side frame sections 20a.

Each of the brace sections 20*d* is coupled to the rear end portion of respective one of the side frame sections 20*a*. Each of the brace sections 20*d* is arranged to be projected outward in the vehicle width direction from the rear end portion of respective one of the side frame sections 20*a*. Each of the brace sections 20*d* is inclined rearward. In this way, a projected end portion thereof is coupled to a lower surface of a front end portion of the floor panel 11.

The front suspension member section 20*b* is hung between intermediate portions of the side frame sections 20*a*. The front suspension 21 is assembled to the front subframe 20. A part (a lower arm and the like) of the front suspension 21 bulges outward in the vehicle width direction from respective one of the side frame sections 20*a*.

As illustrated in FIG. 1 and FIG. 2, the motor 3 is coupled to a rear portion of the engine 2 via a damper. The motor 3 is a synchronous motor of a permanent magnet type. The motor 3 is driven by a three-phase AC generated by inverter control.

In addition, an AT transmission 6 (an automatic transmission) is coupled to a rear portion of the motor 3. The AT transmission 6 shifts and outputs drive power that is output from one or both of the engine 2 and the motor 3 according to a vehicle speed.

A transfer 8 is provided behind the AT transmission 6. A front propeller shaft 9F extends forward from a left side of the transfer 8. A rear propeller shaft 9R extends rearward from the transfer 8. The transfer 8 transmits the drive power, which is output from the AT transmission 6, to the front wheels and the rear wheels through these front propeller shaft 9F and rear propeller shaft 9R.

The damper, the motor 3, the AT transmission 6, the transfer 8, and the rear propeller shaft 9R are coupled in series to the rear portion of the engine 2 and extends linearly and rearward through inside of the tunnel section 11*a*. The AT transmission 6 is arranged inside a front portion of the tunnel section 11*a*. A bracket 22 that is hung between the right and left tunnel side frames 14 is arranged on a lower side of the transfer 8. The transfer 8 is supported by this bracket 22.

An exhaust system 30 including an exhaust manifold is attached to a right side of the engine 2. An exhaust pipe 31 extends from the exhaust system 30 toward a rear end of the electric vehicle 1. A front portion of the exhaust pipe 31 is arranged along the lower surface of the floor panel 11 that expands on a right side of the tunnel section 11*a*. In the tunnel section 11*a*, a rear portion of the exhaust pipe 31 is arranged at a position under the rear propeller shaft 9R and in a state of being in line with the rear propeller shaft 9R. A purification system 32 is installed between the front portion and the rear portion of the exhaust pipe 31.

<High-Voltage Components>

In the electric vehicle 1, vehicle components such as electrical components and a controller that are the same as those in a conventional vehicle traveling by driving the engine are installed. In addition to these vehicle components, a high-voltage battery 60 and plural high-voltage components are mounted on the electric vehicle 1 to drive the motor 3.

More specifically, an inverter 50 (corresponding to the "specified high-voltage component"), a DC/DC converter 40 (a second high-voltage component, also simply referred to as a converter 40), and the like are mounted.

(High-Voltage Battery)

As a power supply of the vehicle components, a battery (usually a lead-acid battery with a voltage of 12 V, hereinafter referred to as a low-voltage battery) is mounted on the engine compartment. In addition thereto, as a power supply of the high-voltage components, a battery (the high-voltage battery 60) with a higher voltage than the above is mounted on the electric vehicle 1.

The high-voltage battery 60 with the voltage of 300 V or higher is mounted on this electric vehicle 1 (a so-called strong hybrid vehicle). The high-voltage battery 60 is large in size. Accordingly, in this electric vehicle 1, as illustrated in FIG. 1, the high-voltage battery 60 is configured as a right and left pair (a right high-voltage battery 60R and a left high-voltage battery 60L), and is arranged in wide areas on the right and left sides of the tunnel section 11*a* in the floor panel 11.

In detail, in the lower surface of the floor panel 11, the right and left high-voltage batteries 60R, 60L are respectively arranged in areas that expand along the floor side frames 13 and the tunnel side frames 14 on the right and left sides and arranged therebetween (in particular, the area on the left side will also be referred to as a "left-side area") that are areas on right and left sides of the transfer 8 and a front portion of the rear propeller shaft 9R. Each of the high-voltage batteries 60R, 60L is stored in a large-sized battery case that is hung between the floor side frame 13 and the tunnel side frame 14.

As illustrated in FIG. 2 and FIG. 3, a left end of a front end portion of the left high-voltage battery 60L is projected forward, and a connection terminal 61 is provided in the projected end portion. The connection terminal 61 is connected to the converter 40 by a CV harness 42. The connection terminal 61 is connected to the inverter 50 by an IV harness 52.

(Inverter, Converter)

As illustrated in FIG. 1, FIG. 2, and FIG. 3, the inverter 50 and the converter 40 are arranged in front of the connection terminal 61 in the left-side area and on a left side of the AT transmission 6.

These inverter 50 and converter 40 are attached to the floor panel 11 via an attachment bracket 70 in an overlapping state in the up-down direction. As illustrated in FIG. 1 and FIG. 2, a guide bracket 80 is arranged in front of the inverter 50 and the converter 40. A description on the attachment bracket 70 and the guide bracket 80 will be made below.

Each of the inverter 50 and the converter 40 is a rectangular plate-shaped component having such an outer shape that each of longitudinal and lateral lengths is sufficiently greater than a thickness (see FIG. 4). Each of the inverter 50 and converter 40 is longer in (lateral) length in the right-left direction than (longitudinal) length in the front-rear direction (that is, has a greater lateral width). The lateral width of the inverter 50 is substantially the same as the lateral width of the converter 40, and the longitudinal width of the inverter 50 is greater than the longitudinal width of the converter 40.

Although not illustrated, three switching circuits are installed in a state of being arranged in horizontal rows in the inverter 50. The motor 3 can stably be controlled by evenly arranging each of the switching circuits for the motor 3. Switching processing is executed by using these switching circuits. In this way, the inverter 50 outputs the three-phase AC that is controlled by the motor 3. By controlling the inverter 50, the motor 3 is driven with specified output.

As illustrated in FIG. 3, the inverter 50 has an IV harness connection section 51, to which the IV harness 52 is connected, in each of a front end portion and a rear end portion of a right portion of the inverter 50. The IV harness 52 that is connected to the motor 3 is connected to the front IV harness connection section 51. The IV harness that is connected to the high-voltage battery 60 is connected to the rear IV harness connection section 51.

The inverter 50 generates heat when being actuated. Accordingly, the inverter 50 is configured that the inverter 50 can be cooled by circulating cooling water (a water-cooling type). An IV cooling water pipe 53, through which the cooling water circulates, is connected to each of the front end portion and the rear end portion of the inverter 50.

The converter 40 steps down the voltage of the high-voltage battery 60 and outputs a DC current with 12 V. The converter 40 has a CV harness connection section 41 on each of right and left sides for connecting the CV harness 42. The CV harness 42 that extends from the high-voltage battery 60 is connected to the right CV harness connection section 41. The CV harness 42 that outputs the current with 12 V is connected to the left CV harness connection section 41.

The converter 40 also generates the heat when being actuated. Accordingly, the converter 40 is configured that the converter 40 can be cooled by circulating cooling water (a water-cooling type). A CV cooling water pipe 43, through which the cooling water circulates, is connected to each of a front side and a rear side in a left portion of the converter 40.

<Attachment Bracket, Guide Bracket>

As described above, on the left side of the AT transmission 6 in the left-side area, the inverter 50 and the converter 40 are attached to the floor panel 11 via the attachment bracket 70 in the overlapping state in the up-down direction. In detail, the inverter 50 and the converter 40 are arranged between the AT transmission 6 and the left floor side frame 13 in a front end portion of the left-side area (in this embodiment, the AT transmission 6 corresponds to the "specified vehicle structure").

As illustrated in FIG. 2 and the like, a rear end portion of a left side of the front subframe 20 is located in front of the left-side area. In detail, the rear end portion of the left side frame section 20a and the left brace section 20d are located. The guide bracket 80 is arranged between this left rear end portion of the front subframe 20 and each of the inverter 50 and converter 40.

Figure 6:
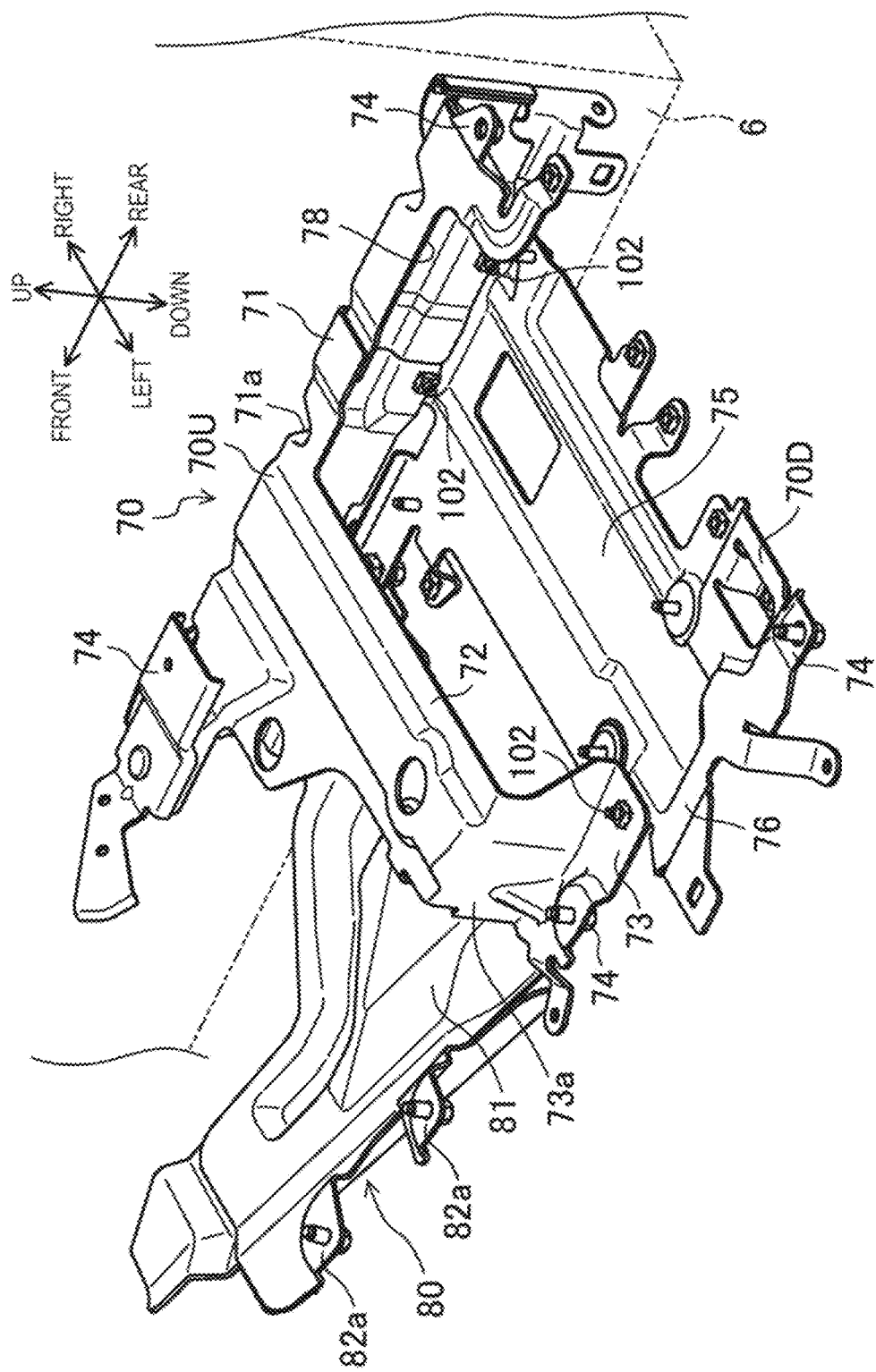
FIG. 6 is a schematic view in which an attachment bracket and the guide bracket are seen from above and the rear.
Figure 7:
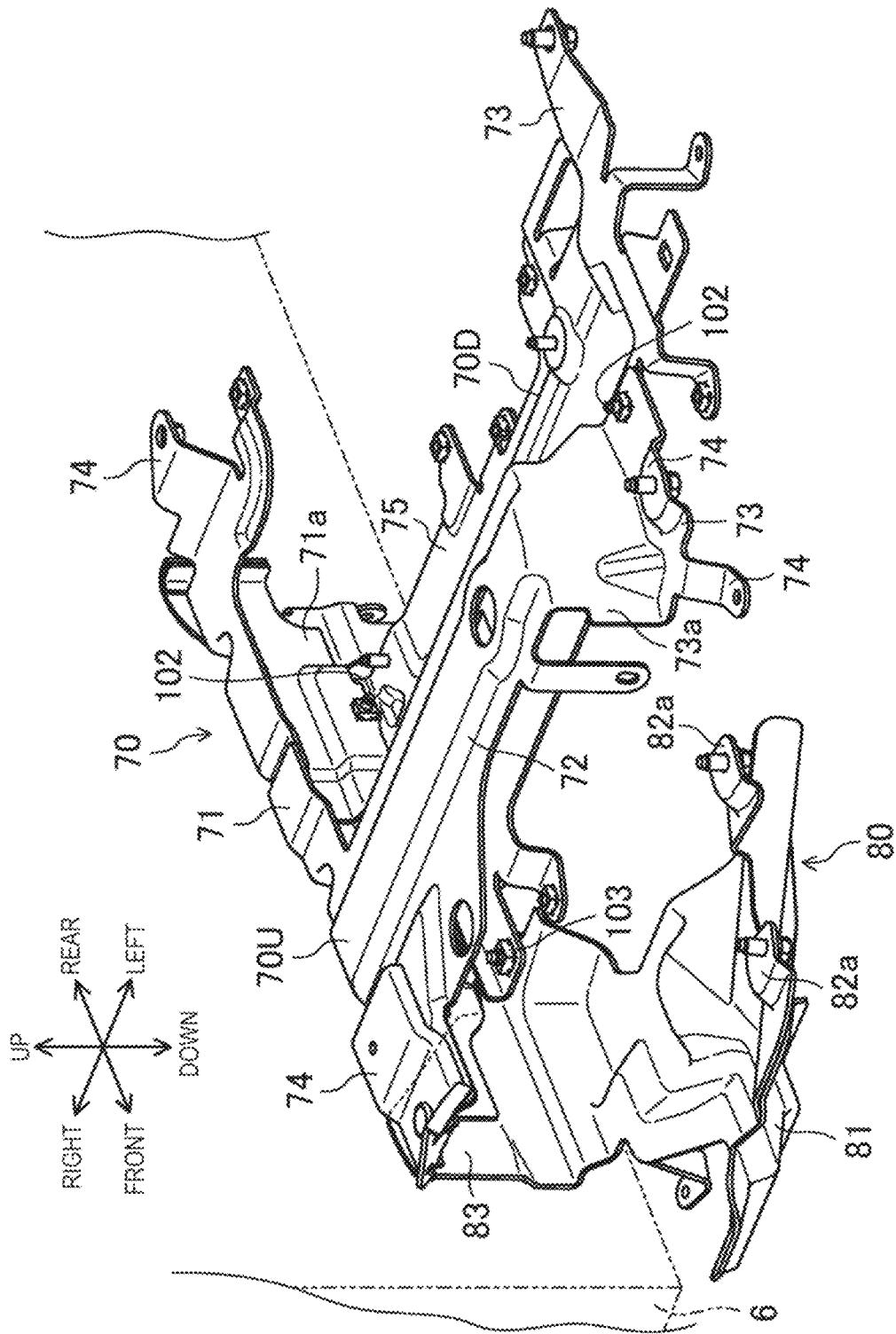
FIG. 7 is a schematic view in which the attachment bracket and the guide bracket are seen from above and front.

FIG. 6 and FIG. 7 illustrate the attachment bracket 70 and the guide bracket 80. Each of the attachment bracket 70 and the guide bracket 80 is made of a pressed metal plate article that is formed to have a specified structure. The attachment bracket 70 and the guide bracket 80 are in a mutually coupled state.

(Attachment Bracket)

The attachment bracket 70 is integrally constructed of an upper bracket 70U and a lower bracket 70D. When seen in the up-down direction, the upper bracket 70U has a substantially L-shaped outer shape (see FIG. 8). When seen in the up-down direction, the lower bracket 70D has a substantially rectangular outer shape that is long in the right-left direction.

Each of the upper bracket 70U and the lower bracket 70D is formed with a specified bending structure and a specified uneven structure. These bending structure and uneven structure structurally strengthen rigidity of each of the upper bracket 70U and the lower bracket 70D.

The upper bracket 70U has: an upper inner attachment section 71 that extends in the front-rear direction; and a hung section 72 that continues with an end of the upper inner attachment section 71 and extends in the right-left direction. The upper inner attachment section 71 has an inner dividing surface 71a that is long in the front-rear direction and opposes the right-left direction. An upper outer attachment section 73 is provided at a projected end of the hung section 72.

The upper outer attachment section 73 has an outer dividing surface 73a that opposes the right-left direction. The outer dividing surface 73a and the inner dividing surface 71a oppose each other in the right-left direction. Each of the upper inner attachment section 71 and the upper outer attachment section 73 is provided with plural fastening seats 74, each of which is used to fasten an attachment bolt 101.

The lower bracket 70D has: a bottom plate section 75 in a substantially rectangular plate shape; and a lower outer attachment section 76 that is provided in an outer end portion in a longitudinal direction of the bottom plate section 75. The lower outer attachment section 76 is provided with plural fastening seats 74, each of which is used to fasten the attachment bolt 101.

The upper bracket 70U and the lower bracket 70D are integrated when being fastened by joint bolts 102 in a state of abutting each other in the up-down direction. In detail, as illustrated in FIG. 4, a bent section 77 is formed by being bent at a right angle with respect to the bottom plate section 75, and is provided in an inner end portion of the bottom plate section 75.

In a state where the inner dividing surface 71a of the upper inner attachment section 71 is superimposed on an outer side of this bent section 77, the joint bolt 102 is fastened from the inner side to the outer side. In this way, the upper bracket 70U and the lower bracket 70D are integrated. Then, as illustrated in FIG. 6 and FIG. 7, in a state where the upper outer attachment section 73 is superimposed on an upper side of the lower outer attachment section 76, the joint bolt 102 is fastened from the lower side to the upper side. In this way, the upper bracket 70U and the lower bracket 70D are integrated.

That is, the joining bolts 102 are fastened in both of the up-down direction and the right-left direction. Accordingly, there is no possibility that all of these joint bolts 102 are sheared due to a load in one of a horizontal direction or a perpendicular direction. The upper bracket 70U and the lower bracket 70D are tightly integrated in an efficient three-dimensional structure. In this way, the attachment bracket 70 is configured to have a highly rigid outer shell structure that is opened in the front-rear direction and is partially opened in the up-down direction and the right-left direction.

Figure 8:
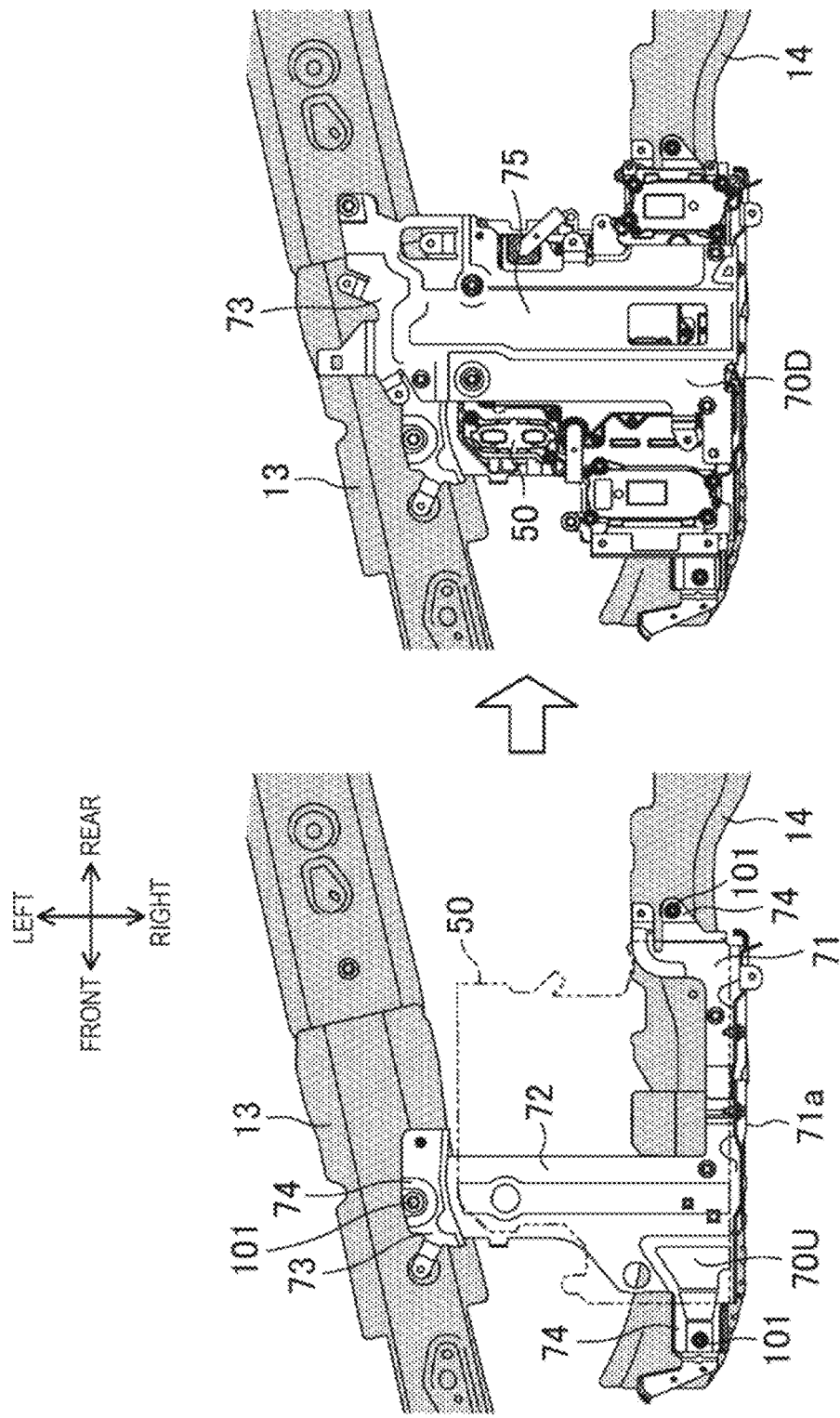
FIG. 8 is a schematic view illustrating an attachment state of the attachment bracket and an inverter.

As illustrated in a left drawing in FIG. 8, the upper inner attachment section 71 is attached to the tunnel side frame 14 by the attachment bolts 101 via the fastening seats 74. The upper outer attachment section 73 is attached to the floor side frame 13 by the attachment bolt 101 via the fastening seat 74.

In this way, as illustrated in FIG. 4, the attachment bracket 70 is in a state of being held between the AT transmission 6 and the floor side frame 13 with a clearance from each of the AT transmission 6 and the floor side frame 13. More specifically, the bottom plate section 75 is located at substantially the same height as lower end portions of both of the AT transmission 6 and the floor side frame 13, and the attachment bracket 70 is located between a left surface of the AT transmission 6 and a right surface of the floor side frame 13.

As a result, the attachment bracket 70 provides the outer shell structure including: an inner wall portion (the inner dividing surface 71a of the upper inner attachment section 71) that opposes the left surface of the AT transmission 6 and at least partially divides the inverter 50 and the AT transmission 6; an outer wall portion (the outer dividing surface 73a of the upper outer attachment section 73) that opposes the right surface of the floor side frame 13 and at least partially divides the inverter 50 and the floor side frame 13; and an upper wall portion (the hung section 72) that is hung between an upper edge of the inner wall portion and an upper edge of the outer wall portion; and a lower wall portion (the bottom plate section 75) that is hung between a lower edge of the inner wall portion and a lower edge of the outer wall portion.

Then, the inverter 50 is stored in the attachment bracket 70. More specifically, as illustrated in a right drawing in FIG. 8, the inverter 50 is stored between the upper bracket 70U and the lower bracket 70D. The inverter 50 is placed on the bottom plate section 75 in the above-described specified arrangement, and is bolted and fixed thereto. Here, since the attachment bracket 70 is opened in the front-rear direction, wiring and piping work for the inverter 50 is easy.

Since the inverter 50 is surrounded by the attachment bracket 70, the inverter 50 can be protected against a bouncing stone and the like during travel. In addition, since the AT transmission 6 and the floor side frame 13 are arranged on the right and left sides of the inverter 50, the inverter 50 can be protected further effectively. Although a space below a vehicle body is small and limited in the up-down direction, the space can effectively be used by such arrangement.

(Protection of Inverter Against Lateral Collision)

Furthermore, this electric vehicle 1 is devised such that the inverter 50 can effectively be protected even during a collision by constructing the outer shell structure by the attachment bracket 70.

That is, there is a case where the vehicle body of the electric vehicle 1 is deformed or damaged by the collision against the electric vehicle 1 from the left (a so-called lateral collision). In such a case, it is highly likely that an external force also acts on the inverter 50, which is arranged in the left-side area. For example, there is a risk that the inverter 50 falls or that the floor side frame 13 or the like hits the inverter 50.

In particular, in the case where the inverter 50 is arranged between the AT transmission 6 and the floor side frame 13 as in this electric vehicle 1, the inverter 50 is possibly crushed by being held therebetween. To handle such a problem, in this electric vehicle 1, the inverter 50 is surrounded by the outer shell structure constructed of the attachment bracket 70.

Figure 11:
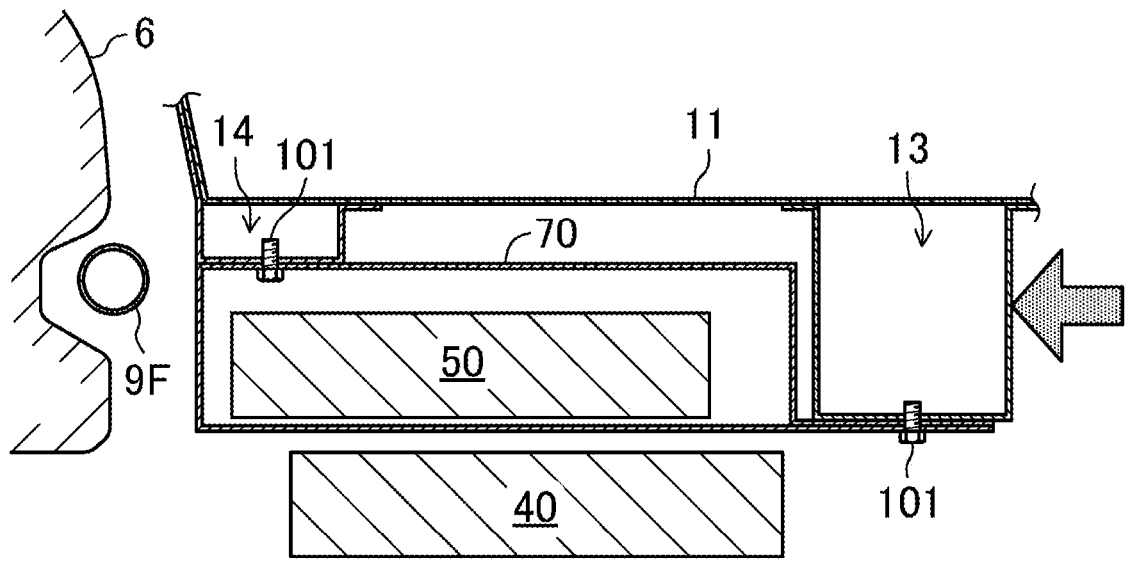
FIG. 11 is a view for explaining stretching action of the attachment bracket during a lateral collision.
Figure 11:
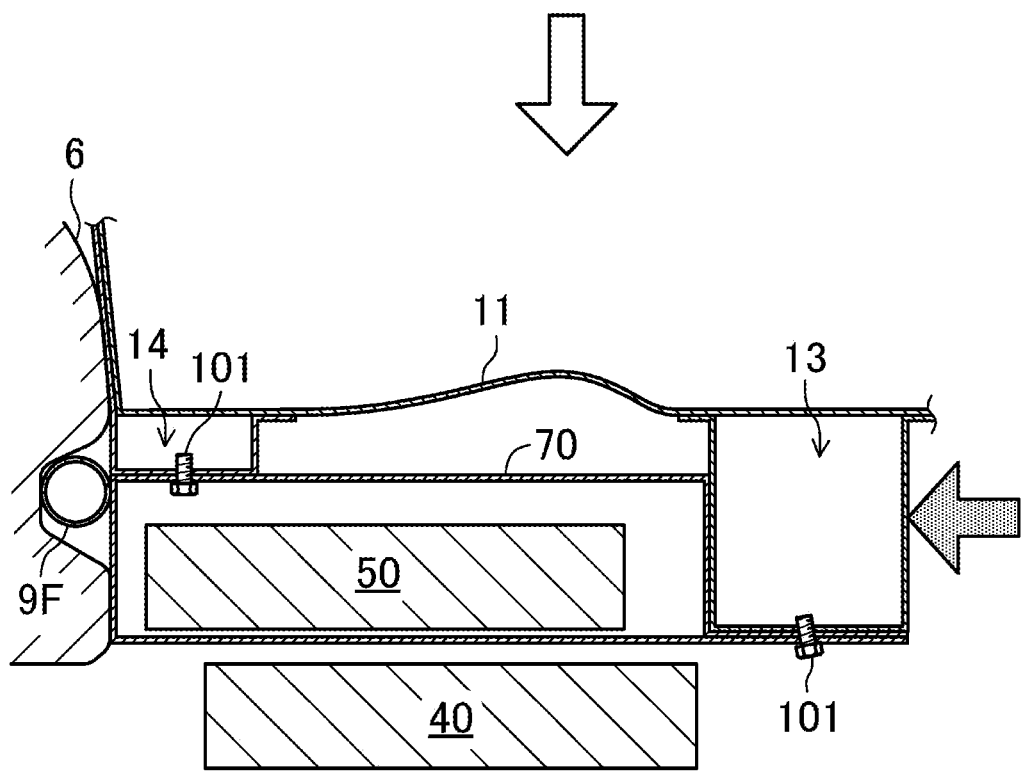

As schematically illustrated in an upper drawing of FIG. 11, during the lateral collision, the floor side frame 13 receives the excessive external force from the outer side thereof. Consequently, the right surface of the floor side frame 13 contacts the attachment bracket 70. Then, the attachment bracket 70 is pressed inward. As schematically illustrated in a lower drawing in FIG. 11, when the floor side frame 13 significantly enters the inner side, the attachment bracket 70 contacts the left surface of the AT transmission 6. As a result, the attachment bracket 70 is pressed from both of right and left sides.

At this time, since the attachment bracket 70 has the highly rigid outer shell structure, the attachment bracket 70 can be stretched against these pressing forces. Thus, the attachment bracket 70 can be prevented from being crushed. The external force does not act on the inverter 50 that is stored in the attachment bracket 70. Thus, even when the lateral collision occurs, the inverter 50 can be protected.

It is possible to prevent the attachment bracket 70 including the inverter 50 from falling since the attachment bracket 70 is held between the AT transmission 6 and the floor side frame 13 by the large force. Furthermore, due to the stretching action of the attachment bracket 70, the clearance between the floor side frame 13 and the tunnel side frame 14 is not changed significantly. That is, the clearance therebetween is only reduced by the clearance on each of the sides of the attachment bracket 70. Accordingly, a shearing force that acts on the attachment bolt 101 is also suppressed. Accordingly, shearing of the attachment bolt 101 can also be prevented.

(Protection of DC/DC Converter)

Furthermore, this electric vehicle 1 is devised such that the converter 40 can also effectively be protected even during the lateral collision by arranging the converter 40 under the lower wall portion (the bottom plate section 75) to cause the converter 40 to overlap the inverter 50.

That is, the converter 40 is bolted and fixed to a lower surface of the bottom plate section 75 in the above-described arrangement. The attachment bracket 70 is also used (concurrently) as a bracket for attaching the converter 40 to the floor panel 11. Thus, the number of components can be reduced. As a result, cost of members can be reduced.

As described above, the size of the converter 40 is substantially the same as or is smaller than the size of the inverter 50. Accordingly, the lateral width (the size in the right-left direction) and the length (the size in the front-rear direction) of the converter 40 are less than the lateral width and the length of the attachment bracket 70. Accordingly, when seen from the above, the converter 40 does not stick out of the attachment bracket 70 but is hidden under the attachment bracket 70.

Thus, even when the lateral collision occurs, due to the stretching state of the attachment bracket 70, there is no possibility that the converter 40 is crushed in the right-left direction. Since the attachment bracket 70 does not fall, the converter 40 does not fall, either. In addition, in the up-down direction, the converter 40 is located at the substantially same height as the lower ends of the AT transmission 6 and the floor side frame 13 or is located below these lower ends of the AT transmission 6 and the floor side frame 13. There is no possibility that the converter 40 is directly held therebetween.

Thus, the converter 40 can also be protected even when the lateral collision occurs. Since the inverter 50 and converter 40 are arranged to overlap each other in the same up-down direction, the wiring and piping work is easy.

(Guide Bracket)

As illustrated in FIG. 6 and FIG. 7, when seen in the up-down direction, the guide bracket 80 has a substantially V-shaped outer shape that is narrowed to the front. The guide bracket 80 has: a guide surface section 81 that extends in the substantially horizontal direction in a state of being inclined upward to the front; a pair of flange sections 82a, 82a provided on an outer side of the guide surface section 81; and a vertical wall section 83 that continues with an inner edge of the guide surface section 81 and extends in a substantially vertical direction.

Each of the flange sections 82a is attached to the floor side frame 13 when being fastened with a bolt. As illustrated in FIG. 7, a rear end portion on the inner side of the guide bracket 80 is further coupled to the attachment bracket 70 when being fastened to a front end portion on the inner side of the lower bracket 70D with a coupling bolt 103.

Figure 9:
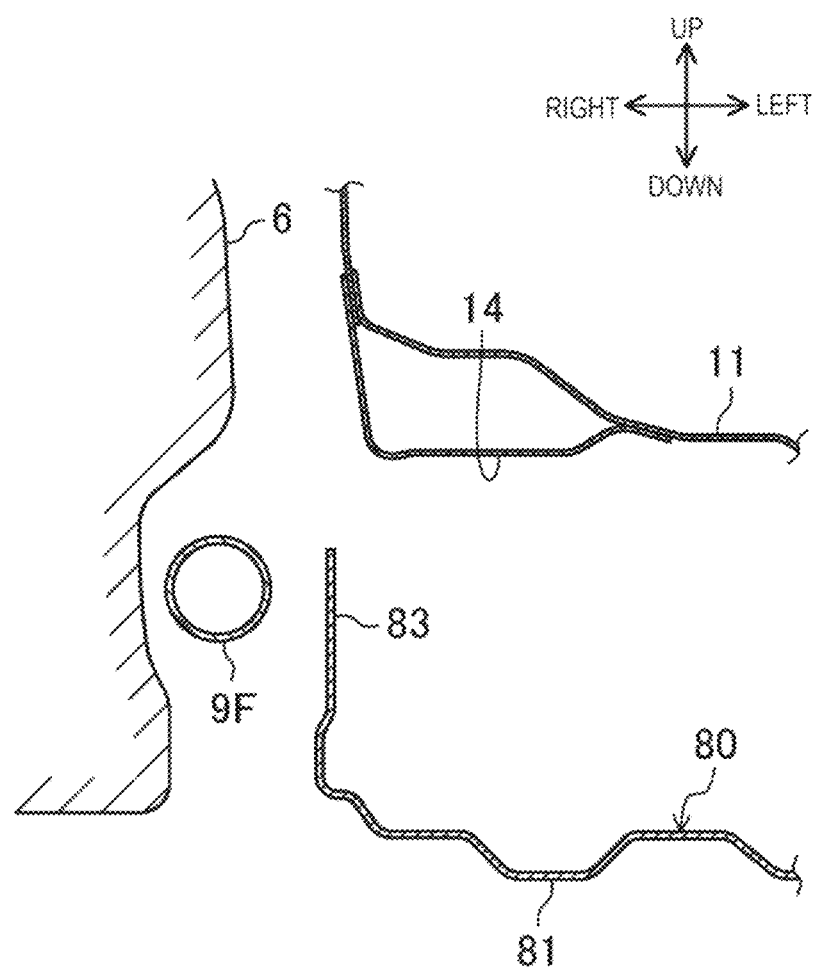
FIG. 9 is a schematic cross-sectional view of a portion indicated by arrow B-B in FIG. 2.

In this way, the vertical wall section 83 is arranged to face the side of the tunnel section 11a. In detail, as illustrated in FIG. 7, the vertical wall section 83 is located below a right edge of the tunnel section 11a and, in a state of overlapping the inner dividing surface 71a on the inner and outer sides, is arranged to divide a space below both of the tunnel section 11a and the left-side area. In addition, as illustrated in FIG. 9, the vertical wall section 83 is configured to oppose the left surface of the lower end portion of the AT transmission 6.

That is, in the state of being coupled to the attachment bracket 70, the guide bracket 80 is attached to both of the tunnel side frame 14 and the floor side frame 13. Accordingly, during the lateral collision, the guide bracket 80 cooperates with the attachment bracket 70, and can thereby suppress the left-side area of the floor panel 11 from being crushed in the right-left direction. Thus, it is possible to further protect the inverter 50 and the converter 40 during the lateral collision.

Furthermore, during the lateral collision, the vertical wall section 83 is pressed against the AT transmission 6. Similar to the attachment bracket 70, the guide bracket 80 is also brought into a stretched state in the right-left direction. Since the guide bracket 80 is also firmly supported, the guide bracket 80 can be prevented from falling.

Figure 10:
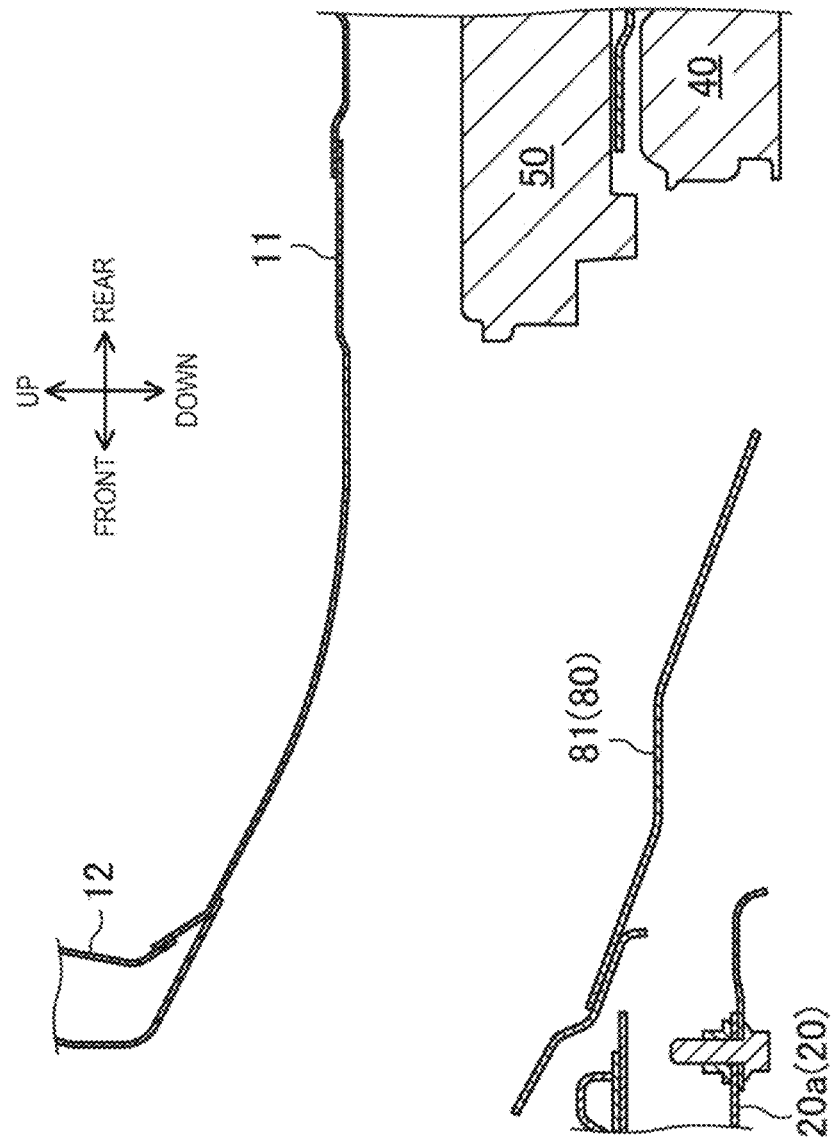
FIG. 10 is a schematic cross-sectional view of a portion indicated by arrow C-C in FIG. 2.

The guide bracket 80 is arranged in a tip portion of the left-side area, that is, between the left rear end portion of the front subframe 20 and the attachment bracket 70. Accordingly, as illustrated in FIG. 10, a tip of the guide surface section 81 is configured to be located above the rear end portion of the front subframe 20. A rear end of the guide surface section 81 is configured to be oriented downward in comparison with the converter 40.

There is a case where the vehicle body of the electric vehicle 1 is deformed or damaged due to a collision from the front (a so-called frontal collision), in particular, a collision obliquely from the front to the right (a so-called oblique collision). In such a case, the front subframe 20 possibly moves rearward, and the left rear end portion thereof possibly enters the left-side area.

To handle such a problem, the guide surface section 81 with the above-described structure is arranged as described above. Thus, in the case where the front subframe 20 moves rearward, the rear end portion of the front subframe 20 is guided to a position below the converter 40. Thus, the inverter 50 and converter 40 can also be protected during the frontal collision and the oblique collision.

(Pipe Protection)

Furthermore, this electric vehicle 1 is devised such that a pipe 90 can also be protected against the lateral collision. More specifically, in the lower portion of the electric vehicle 1, the plural fluid pipes 90 are routed along the lower surface of the floor panel 11 and extend in the front-rear direction such that a fluid such as fuel or the cooling water flows therethrough. As illustrated in FIG. 4 and FIG. 5, these pipes 90 are routed through a clearance above the upper wall portion (the hung section 72). The pipes 90, the inverter 50, and the converter 40 are arranged in three layers above, inside, and below the attachment bracket 70.

More specifically, a battery refrigerant pipe 90a through which the cooling water for cooling the battery flows, a fuel pipe 90b through which the fuel of the engine 2 flows, and a brake pipe 90c through which hydraulic oil for actuating brakes of the rear wheels flows are routed along the lower surface of the floor panel 11, which is located above the attachment bracket 70, in a state of being concentrated in a central portion in the right-left direction. Accordingly, these plural pipes 90 can also be protected against the lateral collision by the stretching action of the attachment bracket 70.

Some of these plural pipes 90 (the fuel pipe 90b and the brake pipe 90c) are routed along the inner side of the floor side frame 13, which is a strength member, in the floor panel 11. Since these pipes 90 are routed to run above the attachment bracket 70, the pipes 90 are located away from the floor side frame 13. As a result, these pipes 90 are unstably supported.

To handle such a problem, in this electric vehicle 1, a pipe holder 91 that supports the plural pipes 90 is arranged above the attachment bracket 70. The pipe holder 91 is formed from a flat member that is laterally long, and is attached to the lower surface of the floor panel 11. The plural pipes 90 are stably supported by the pipe holder 91.

As illustrated in FIG. 5, FIG. 6, and the like, the upper bracket 70U of the attachment bracket 70 is provided with a rectangular notch 78 behind the hung section 72, and the notch 78 is opened on the floor side frame 13 side. The pipe holder 91 is arranged above the notch 78. The plural pipes 90 that are supported by the pipe holder 91 extend rearward through the notch 78.

The fuel pipe 90b and the brake pipe 90c, each of which extends further rearward, are bent to the floor side frame 13 side by using the notch 78 and a space in front of the notch 78. Accordingly, these pipes 90b, 90c can be routed easily.

In this way, the fuel pipe 90b and the brake pipe 90c are routed along the inner side of the floor side frame 13 again. Just as described, the plural pipes 90, each of which is routed along the lower surface of the floor panel 11 and extends in the front-rear direction, are also devised to be protected during the lateral collision by using the stretching action of the attachment bracket 70.

That is, in this electric vehicle 1, the structure of the attachment bracket 70, which is located between the AT transmission 6 and the floor side frame 13 and supports the inverter 50, is formed three-dimensionally to obtain high rigidity. As a result, the inverter 50 is stored in the attachment bracket 70. Accordingly, even when the floor side frame 13 is pressed to the AT transmission 6 side by the large force, the attachment bracket 70 is stretched in the right-left direction.

As a result, even when the lateral collision occurs, the inverter 50 that is stored in the attachment bracket 70 can be protected. Furthermore, the converter 40 is arranged below the attachment bracket 70. The plural pipes 90 are arranged above the attachment bracket 70. Thus, the converter 40 and the plural pipes 90 can also be protected against the lateral collision.

In addition, the guide bracket 80 is attached to the front side of the attachment bracket 70. In this way, the protection against the lateral collision can be enhanced, and these members can be protected against the frontal collision and the oblique collision. Thus, according to this electric vehicle 1, to which the disclosed technique is applied, safety can effectively be improved.

The disclosed technique is not limited to the above-described embodiment and includes various configurations other than that described in the above-described embodiment. For example, in the embodiment, the transmission is exemplified as the "specified vehicle structure". However, the present disclosure is not limited thereto. For example, the "specified vehicle structure" may be another vehicle component such as the motor or a partial structure of the vehicle component such as the tunnel side frame.

What is claimed is:

1. A lower structure of an electric vehicle on which a high-voltage driving battery is mounted and which can travel by using electric power thereof, the lower structure of the electric vehicle comprising:
a floor panel that expands in a lower portion of a cabin;
a specified vehicle structure that is provided below the floor panel and in an intermediate portion in a right-left direction thereof;
a pair of floor side frames that extend in a front-rear direction along right and left portions of the lower surface of the floor panel;
a specified high-voltage component that is connected to the high-voltage battery and is arranged between the vehicle structure and one of the pair of floor side frames; and
an attachment bracket that attaches the high-voltage component to the floor panel, wherein
the attachment bracket has an outer shell structure including:
an inner wall portion that at least partially divides the high-voltage component and the vehicle structure;
an outer wall portion that at least partially divides the high-voltage component and the one of the pair of floor side frames;
an upper wall portion that is positioned between an upper edge of the inner wall portion and an upper edge of the outer wall portion; and
a lower wall portion that is positioned between a lower edge of the inner wall portion and a lower edge of the outer wall portion.

2. The lower structure of the electric vehicle according to claim 1 further comprising:
a tunnel section that is provided to extend in the front-rear direction by recessing the intermediate portion in the right-left direction of the floor panel upward; and
a tunnel side frame that extends along a lower edge of the tunnel section, wherein
the vehicle structure is a transmission that is arranged in the tunnel section, and
the outer wall portion opposes a lateral surface of one of the pair of floor side frames, and the inner wall portion opposes a lateral surface of the transmission when the attachment bracket is attached to the tunnel side frame.

3. The lower structure of the electric vehicle according to claim 1 further comprising:
a second high-voltage component that is connected to the high-voltage battery and is arranged between the vehicle structure and the one of the pair of floor side frames, wherein
the second high-voltage component is arranged below the lower wall portion so as to overlap the high-voltage component.

4. The lower structure of the electric vehicle according to claim 2 further comprising:
a second high-voltage component that is connected to the high-voltage battery and is arranged between the vehicle structure and the one of the pair of floor side frames, wherein
the second high-voltage component is arranged below the lower wall portion so as to overlap the high-voltage component.

5. The lower structure of the electric vehicle according to claim 3 further comprising:
a front subframe that is arranged in front of the floor panel and one of a right or left rear end portion which is located in front of the high-voltage component; and
a guide bracket that is arranged between the front subframe and the high-voltage component, wherein
the guide bracket has:
a guide surface section that is inclined upward to the front; and
a pair of flange sections that are provided on both sides of the guide surface section, and
one of the flange sections is attached to the one of the pair of floor side frames, another of the flange sections is attached to the tunnel side frame, and the guide surface section guides the front subframe to a position below the second high-voltage component when the front subframe moves rearward.

6. The lower structure of the electric vehicle according to claim 4 further comprising:
a front subframe that is arranged in front of the floor panel and one of a right or left rear end portion which is located in front of the high-voltage component; and
a guide bracket that is arranged between the front subframe and the high-voltage component, wherein
the guide bracket has:
a guide surface section that is inclined upward to the front; and
a pair of flange sections that are provided on both sides of the guide surface section, and
one of the flange sections is attached to the one of the pair of floor side frames, another of the flange sections is attached to the tunnel side frame, and the guide surface section guides the front subframe to a position below the second high-voltage component when the front subframe moves rearward.

7. The lower structure of the electric vehicle according to claim 5, wherein
the guide bracket has a vertical wall portion that opposes the vehicle structure in the right-left direction.

8. The lower structure of the electric vehicle according to claim 6, wherein
the guide bracket has a vertical wall portion that opposes the vehicle structure in the right-left direction.

9. The lower structure of the electric vehicle according to claim 1 further comprising:
at least one pipe that extends in the front-rear direction along the floor panel to cause a fluid to flow therethrough, wherein
the pipe is routed above the upper wall portion.

10. The lower structure of the electric vehicle according to claim 2 further comprising:
at least one pipe that extends in the front-rear direction along the floor panel to cause a fluid to flow therethrough, wherein
the pipe is routed above the upper wall portion.

11. The lower structure of the electric vehicle according to claim 3 further comprising:
at least one pipe that extends in the front-rear direction along the floor panel to cause a fluid to flow therethrough, wherein
the pipe is routed above the upper wall portion.

12. The lower structure of the electric vehicle according to claim 5 further comprising:
at least one pipe that extends in the front-rear direction along the floor panel to cause a fluid to flow therethrough, wherein
the pipe is routed above the upper wall portion.

13. The lower structure of the electric vehicle according to claim 6 further comprising:
at least one pipe that extends in the front-rear direction along the floor panel to cause a fluid to flow therethrough, wherein
the pipe is routed above the upper wall portion.

14. The lower structure of the electric vehicle according to claim 7 further comprising:
  at least one pipe that extends in the front-rear direction along the floor panel to cause a fluid to flow therethrough, wherein
  the pipe is routed above the upper wall portion.

15. The lower structure of the electric vehicle according to claim 8 further comprising:
  at least one pipe that extends in the front-rear direction along the floor panel to cause a fluid to flow therethrough, wherein
  the pipe is routed above the upper wall portion.

16. The lower structure of the electric vehicle according to claim 9, wherein
  a plurality of the at least one pipe are provided, and
  the plurality of the at least one pipe are routed in a central portion in the right-left direction of the upper wall portion.

17. The lower structure of the electric vehicle according to claim 10, wherein
  a plurality of the at least one pipe are provided, and
  the plurality of the at least one pipe are routed in a central portion in the right-left direction of the upper wall portion.

18. The lower structure of the electric vehicle according to claim 11, wherein
  a plurality of the at least one pipe are provided, and
  the plurality of the at least one pipe are routed in a central portion in the right-left direction of the upper wall portion.

19. The lower structure of the electric vehicle according to claim 12, wherein
  a plurality of the at least one pipe are provided, and
  the plurality of the at least one pipe are routed in a central portion in the right-left direction of the upper wall portion.

20. The lower structure of the electric vehicle according to claim 13, wherein
  a plurality of the at least one pipe are provided, and
  the plurality of the at least one pipe are routed in a central portion in the right-left direction of the upper wall portion.

* * * * *